United States Patent [19]

Fogle

[11] 4,403,384

[45] Sep. 13, 1983

[54] APPLICATOR FOR DIRECT ROLL COATING

[75] Inventor: Ozzie Fogle, Orangeburg, S.C.

[73] Assignee: Champion International Corporation, Stamford, Conn.

[21] Appl. No.: 223,950

[22] Filed: Jan. 12, 1981

Related U.S. Application Data

[62] Division of Ser. No. 156,818, Jun. 5, 1980.

[51] Int. Cl.[3] .......................... B21B 31/08; B60B 7/04

[52] U.S. Cl. .......................................... 29/130; 29/132

[58] Field of Search .......................... 29/130, 131, 132

[56] References Cited

U.S. PATENT DOCUMENTS

| | | | |
|---|---|---|---|
| 2,794,240 | 6/1957 | Allen | 29/131 |
| 2,959,119 | 11/1960 | Gould et al. | 29/131 UX |
| 3,467,009 | 9/1969 | Ross | 29/130 UX |
| 3,710,470 | 1/1973 | Krake | 29/131 |
| 3,910,186 | 10/1975 | D'Amato et al. | 29/131 |

*Primary Examiner*—Wayne L. Shedd
*Attorney, Agent, or Firm*—Evelyn M. Sommer

[57] ABSTRACT

A paint applicator for direct roll coating of textured panels or sheet-like members comprises a core, a layer of fibrous web material disposed over the core, a protective plastic tube member disposed around the layer of fibrous web material, and a layer of woven material disposed over the protective tube member. The fibrous web allows for uniform application of the paint film due to its softness and ability to follow contoured surfaces. The protective tube member prevents paint from penetrating the fiber web. The woven material carries the paint on the roll applicator.

4 Claims, 4 Drawing Figures

APPLICATOR FOR DIRECT ROLL COATING

This is a division of application Ser. No. 156,818, filed June 5, 1980.

BACKGROUND OF THE INVENTION

The subject invention relates to an apparatus for applying a coating material to textured or unevenly surfaced sheet-like materials, and more particularly, to a paint applicator for direct roll coating of textured panel members such as exterior siding or interior plywood panels having a contoured surface. These panels are generally composed of wood or synthetic material which is intended to simulate a wooden appearance and typically include striations or a plurality of grooves for providing the desired aesthetic effect. In practice, it is desirable that these panels have different colors for matching different home decors, and so the panels must be painted or dye coated. It will be appreciated that the painting or dye coating process must be a continuous one for economical reasons and that the method of applying the coating must be such that all the crevices in the striations and grooves are thoroughly covered.

There are several techniques now being used for coating textured or unevenly surfaced wood panels. For example, in one technique the surface of the panel is coated with a knife coater. The panel is then brushed or subjected to an air blast to remove excess paint. This technique has been found to be inefficient, however, because of the loss of paint during the process. Another technique currently used is spray coating the surface of the panel. It will be appreciated that such a process is also inefficient and that there is a substantial loss of paint. There is also a problem with air pollution. A further technique used for coating the panels is coating the panel with a rubber or paint type roller. However, with this technique there is poor control of the paint film and inconsistency of results with some of the striations or grooves in the panel being left uncoated. This has been found to be especially true after a period of use when the paint dries on the outer surface of the roller, thus rendering the roller inflexible and unable to penetrate the striations and grooves of the panel.

Accordingly, it is an object of the subject invention to provide a paint applicator for direct roll coating of textured panel members which allows for the uniform application of the paint film.

It is another object of the subject invention to provide a paint applicator for coating textured panel members which is efficient and in which the paint applied is controlled so as to minimize loss of paint and air pollution.

It is a further object of the subject invention to provide an applicator for roll coating textured panel members as described above which is simple in construction and relatively inexpensive to manufacture.

SUMMARY OF THE INVENTION

In accordance with the above-stated objectives, the subject invention provides a paint applicator for direct roll coating of textured panels or sheet-like members which comprises a core member and a layer of fibrous web material disposed over the core. The fibrous material may be a synthetic or natural fiber which is preferably of a web construction held together by a binding adhesive. A protective tube member is disposed around the layer of fibrous web material, the tube being preferably a thin impervious plastic material such as polyethylene. A thin layer of woven material, such as woven sock material, is disposed over the protective tube member to complete the construction of the subject roll coater.

DETAILED DESCRIPTION OF THE PREFERRED EMBODIMENTS

Figure 1:
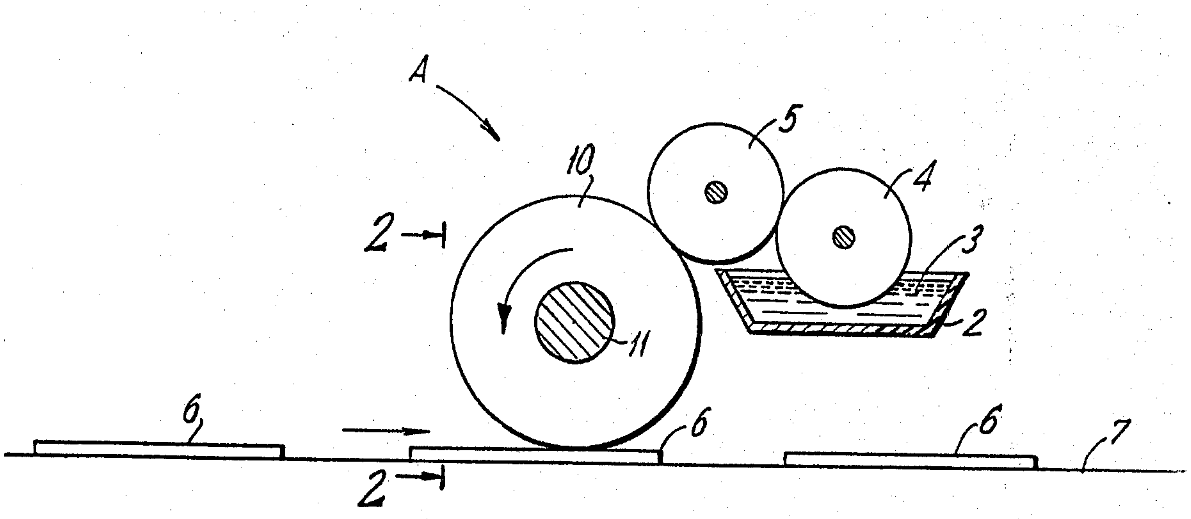
FIG. 1 is a front elevational schematic view, sectioned in part, illustrating the operation of the roll coater of the subject invention.

Referring to FIG. 1, there is illustrated a schematic drawing illustrating a continuous coating apparatus A employing the direct roll coating applicator of the subject invention, the applicator being designated generally by reference numeral 10. As illustrated in FIG. 1, the apparatus A includes a moving conveyor belt 7 which carries panel members 6 in succession into contact with roll coater 10. The apparatus A also includes a reservoir 2 which contains the coating material 3, and a pair of rollers 4 and 5, roller 4 being partially immersed in coating material 3. Typically, coating material 3 is a paint or dye. As rollers 4 and 5 rotate, they carry coating material 3 from reservoir 2 to the outer surface of roll coater 10. Roll coater 10 in turn rotates along shaft 11, continuously receives fresh coating material, and applies the coating to the panels 6 passing thereunder along belt 7. It will be appreciated that there are many methods of applying the coating material 3 to the outer surface of roll coater 10 besides that illustrated in FIG. 1, and that said illustration is in no way intended to limit the scope of the subject invention.

Figure 3:
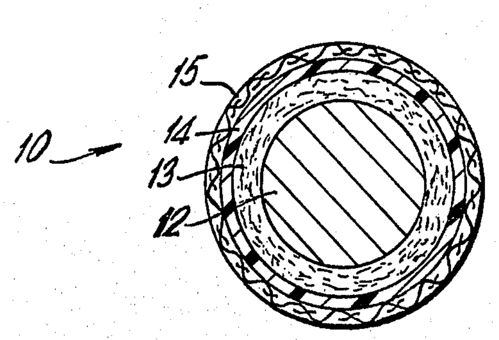
FIG. 3 is a cross-sectional view of the roll coater of the subject invention taken along lines 3—3 of FIG. 2.
Figure 4:
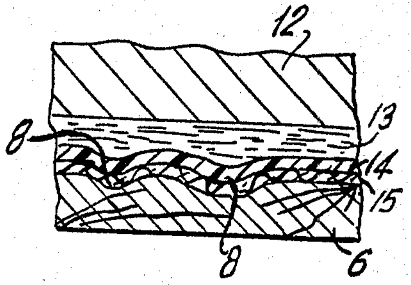
FIG. 4 is an enlarged cross-sectional view of the roll coater of the subject invention taken alone lines 4—4 of FIG. 2.

Turning now to the detailed construction of the subject roll coating applicator, and specifically to FIGS. 3 and 4, the applicator 10 of the subject invention includes a central core member 12, and a layer of fibrous, compressible, pliable material disposed around the core. Preferably, the fibrous material is of a web construction that is held together by a binding adhesive. The material may be of a natural fiber or formed from a synthetic material, and can vary in density and in coarseness according to the desired application. The function of web material 13 will be described in more detail below.

Further referring to FIGS. 3 and 4, a very thin, flexible, tube member 14 is disposed over and around the layer of fibrous web material 13. The tube 14 may be any suitable flexible, impervious plastic material such as for example, polyethylene. The final layer of the subject applicator 10 comprises a thin layer of woven material 15, preferably woven sock material which is disposed around tube 14. As is shown in FIGS. 3 and 4, the tube 14 and woven material 15 comprise very thin layers of the subject applicator as compared to the relatively thick layer of fibrous web material 13.

Figure 2:
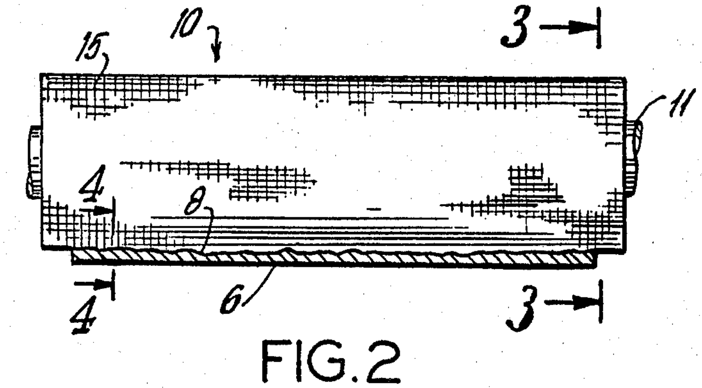
FIG. 2 is a side elevational view, sectioned in part, of the roll coater of the subject invention taken along lines 2—2 of FIG. 1.

Referring now to FIGS. 2 and 4, and especially to the enlarged sectional view illustrated in FIG. 4, it will be noted that the surface 8 of panel 6 which comes in contact with roll applicator 10 is textured and quite irregular. However, in accordance with the subject invention, roll applicator 10 is able to completely and uniformly cover the surface 8 of panel 6 with coating material. Referring to FIG. 4, it will be noted that the relatively thick layer of fibrous web material which is quite soft and pliable, easily takes the form of, and completely covers the crevices in irregular surface 8. The thin, impervious polyethylene tube member 14 which is disposed around fibrous layer 13 prevents any coating material from penetrating layer 13 and thus, keeps it in its soft, pliable state at all times. Because tube 14 is very thin it does not inhibit the ability of relatively thick layer 13 from assuming the contours of the panel 6. The third layer of the subject applicator 10 is the layer of woven sock material 15 which receives the coating material from rollers 4 and 5 (see FIG. 1), carries the coating material, and applies it to the panels 6. Because woven layer 15 is also quite thin relative to fibrous layer 13, there is no inhibition of fiber 13 from fully assuming the contours of panel 6 so as to completely coat the panel.

In summary, the subject invention provides an improved means for coating textured or uneven panel surfaces. The subject roll coating applicator includes a relatively thick layer of a fibrous web material which permits uniform application of a coating film to a panel due to the softness of the web material and its ability to follow contoured surfaces. The subject applicator also includes a very thin protective covering over the fibrous web layer which prevents the coating material from penetrating the fiber web. Thus, there is no loss of the soft construction of the fiber after periods of use and drying of the applicator. The subject applicator is simple in construction and relatively inexpensive to manufacture, and can be made to fit standard direct roll coaters.

While the preferred embodiment of the subject invention has been described and illustrated, it would be obvious that various changes and modifications can be made therein without departing from the spirit of the invention which should be limited only by the scope of the appended claims.

What is claimed is:

1. An applicator for direct roll coating of a surface of a textured panel, said surface of said textured panel defining a plurality of contours, said applicator comprising:

an elongated central core member of annular cross-section;

a layer of fibrous pliable material disposed on said central core member, said layer of fibrous pliable material being of web construction and held together by a binding adhesive, said fibrous layer having a radial thickness of sufficient dimension to enable said fibrous layer to assume the contours of said textured panel without exceeding the elastic limit of said fibrous layer;

a protective tube member of pliable impervious polyethylene material disposed around said layer of fibrous web material, said tube member having a smaller radial thickness than said layer of fibrous material; and a layer of woven material disposed over said protective tube member, said layer of woven material being of smaller radial thickness than the radial thickness of the layer of fibrous material, whereby said tube member and said layer of woven material are urged by said fibrous layer into continuous rolling contact with said contours on said surface of said textured panel.

2. An applicator as recited in claim 1 in which said layer of fibrous material is made from a synthetic material.

3. An applicator as recited in claim 1 in which said layer of fibrous material is made from a natural fiber.

4. An applicator as recited in claim 1 in which said layer of woven material is made from a woven sock material.

* * * * *